(12) United States Patent
Truong

(10) Patent No.: US 6,192,624 B1
(45) Date of Patent: Feb. 27, 2001

(54) DISPLAYING DWARF TREES

(76) Inventor: Mac Truong, 327 DeMott Ave., Teaneck, NJ (US) 07666

(*) Notice: Subject to any disclaimer, the term of this patent is extended or adjusted under 35 U.S.C. 154(b) by 0 days.

(21) Appl. No.: 09/283,855

(22) Filed: Apr. 1, 1999

(51) Int. Cl.$^7$ .................................................. A01G 13/00
(52) U.S. Cl. ........................................ 47/58.1; 47/1.01 R
(58) Field of Search .......................... 47/1.01 R, 17, 47/33, 58.1

(56) References Cited

U.S. PATENT DOCUMENTS

| | | | |
|---|---|---|---|
| 2,069,292 | * 2/1937 | Walker | 47/58.1 |
| 2,436,770 | * 2/1948 | Hill et al. | 47/33 |
| 4,135,330 | * 1/1979 | Aoyama | 47/1.01 R |
| 5,409,508 | * 4/1995 | Erickson | 47/17 X |

* cited by examiner

*Primary Examiner*—Robert P. Swiatek
(74) *Attorney, Agent, or Firm*—John R. Ewbank

(57) ABSTRACT

A Memorial Grove is designed so that the walkways for spectators are spaced from the displayed trees, thereby minimizing the amount of vandalism attributable to spectators touching the trees. Substantially each of the trees is a dwarf tree, whereby the capital investment per tree is less than when employing trees of conventional size. A shiftable skylight protects the displayed trees from adverse weather without encountering the problems inherent in growing trees in a building interior having trivial exposure to the weather.

3 Claims, 1 Drawing Sheet

DISPLAYING DWARF TREES

BACKGROUND

1. Field of Invention

A Memorial Grove of the type described in Truong U.S. Pat. No. 5,799,488 can be costly to construct and maintain because the cost of urban and suburban land has increased in recent decades. Plant biologists have developed a few varieties of dwarf trees which permit practice of the method of Truong U.S. Pat. No. 5,799,488 at a capital investment which is less than using conventional trees such as black walnut trees. Some dwarf trees are susceptible to damage if frequently touched by human hands. Some vandals tend to damage dwarf trees. Many problems arise when attempts are made to grow trees in the interior of a building consistently protected from the variations of the weather. It is desirable, however, to protect dwarf trees from severe weather adversities.

2. Prior Art

Truong U.S. Pat. No. 5,799,488 describes a Memorial Grove in which each tree has grown from a nutrient composition comprising the remains of a particular individual, and the seedling is nurtured to provide Chen U.S. Pat. No. 4,780,994 describes a "skyscraper cemetery" in which the microorganisms in the Soil can compost a casket and body even when in a vault several stories above the street level.

SUMMARY OF THE INVENTION

In accordance with the present invention, a seedling of a dwarf tree is nurtured in a nutrient featuring the remains of a particular individual, and the seedling is nurtured to provide a dwarf tree suitable for display, while continually maintaining its unique identification with said particular individual. After the dwarf tree has matured sufficiently for being on display, it is positioned in grove or array of trees which are spaced from the spectators walkway sufficiently to decrease the likelihood of spectators touching such Memorial Tree. Optionally such walkway and array of trees are in a building having a skylight which can be shifted to cover an area during times of adverse weather, but permitting the weather changes to be felt in the display zone whenever the skylight is in its parked position.

DRAWING

Figure 1:
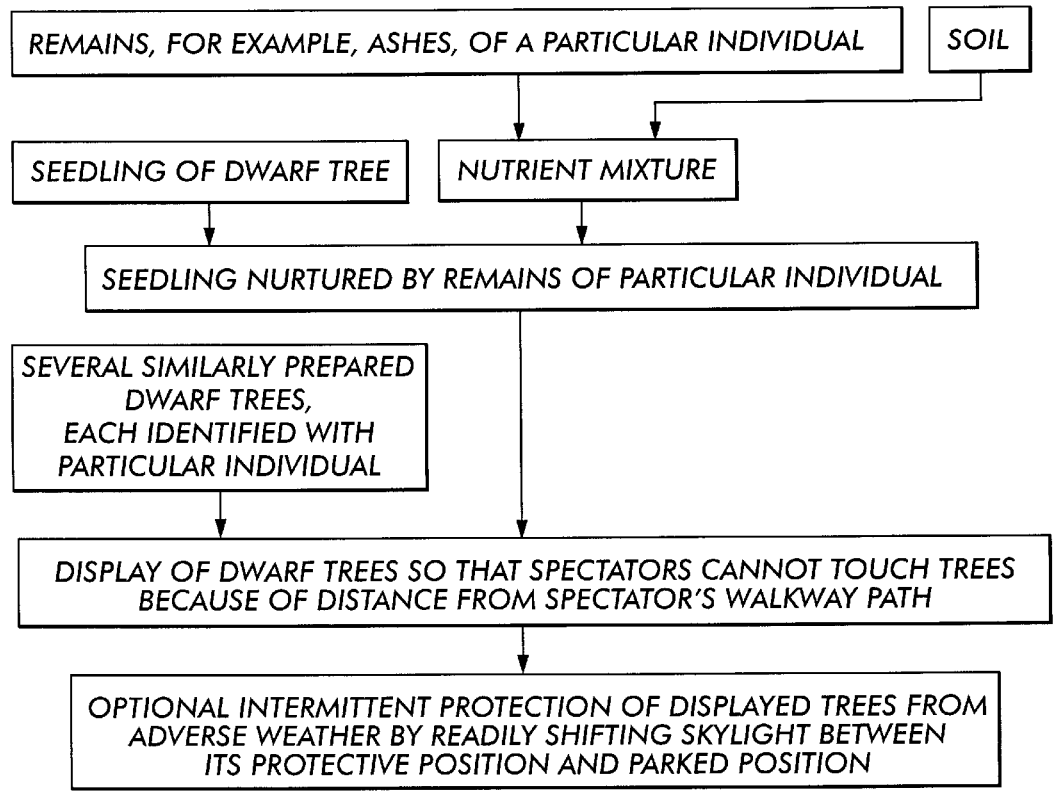

In the accompanying drawing, FIG. 1 is a schematic flowsheet of a process of the present Invention.

Figure 2:
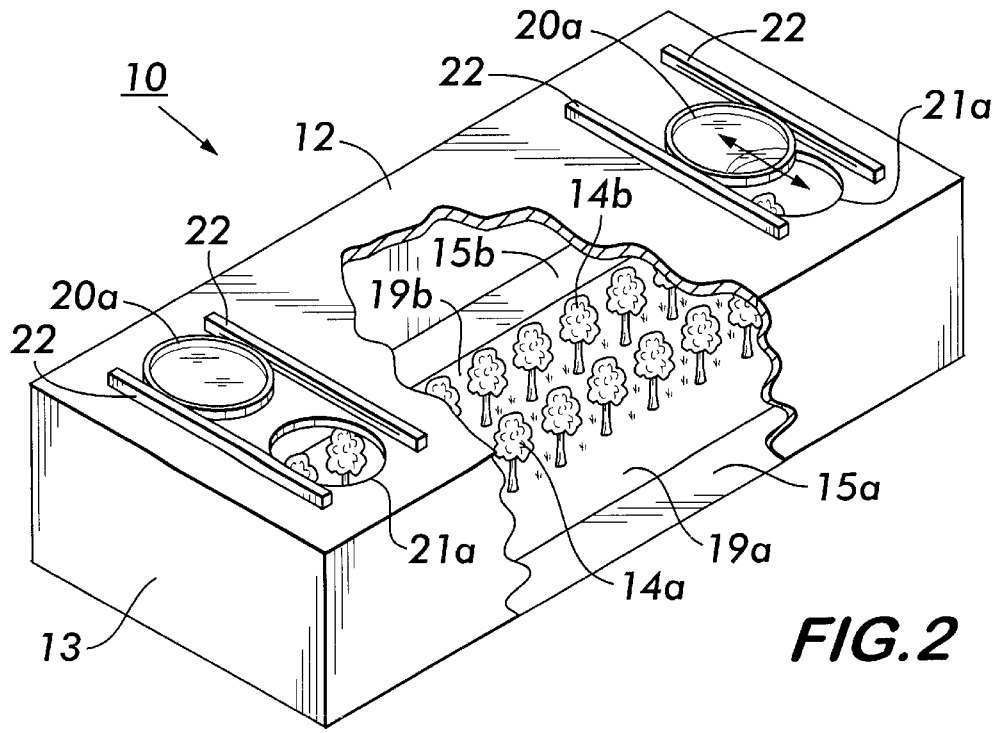

FIG. 2 is a schematic perspective view of one embodiment of the invention.

DESCRIPTION OF A PREFERRED EMBODIMENT

After a particular human has died and been cremated, his ashes are mixed with an approximately equal amount of soil to provide a nutrient. A seedling of a dwarf tree is planted in Such nutrient and nurtured to become a dwarf tree. Such steps are taken for dozens of particular individuals, care being taken throughout the process to maintain the identity of the particular Individual with a particular seedling-tree. After a plurality of dwarf trees have thus been prepared, they are assembled as a Memorial Grove or array of dwarf trees, each identified with a particular individual. Such steps are also clarified in the Flow Sheet of FIG. 1. Particular attention is directed to the spacing of the displayed dwarf trees at a sufficient distance away from spectators that the spectators cannot readily touch the dwarf trees, some of which are sensitive to Touching, and thus prone to vandalism.

By using the dwarf trees, the investment for display space is significantly less than for the display of a black walnut tree of the type exemplified in Truong U.S. Pat. No. 5,799,488. A grandfather might purchase the display space for dwarf trees not only for his wife, but also for children and grandchildren for as small a sum as required for the purchase of the space for a black walnut tree in a memorial grove.

Trees, including dwarf trees, thrive best when exposed to some of the changes in the weather. However, certain adverse weather conditions can significantly endanger any tree, even a dwarf tree. B) providing a building having a roof having a large opening and a slideable skylight which can be usually parked where it is not covering such opening, the dwarf trees can have both the benefits of outdoor growth most of the time and the protection of a building during adverse weather.

As shown in FIG. 2, a building 10 having a floor 11 and a flat roof 12 supported by walls 13 can be adapted to protect the Memorial Grove of a display of many dwarf trees 14a, 14b, etc. from vandalism, and if desired, also protect from adverse weather conditions. Suitable walkways 15a, 15b are positioned along at least one wall, and are spaced from the ceiling by at least 6 feet. Such walkways 15 accommodate spectators desiring to see the dwarf trees of the Memorial Grove, each tree being so marked as to be identified with the particular individual whose remains nurtured such dwarf tree. In FIG. 2, a portion of the ceiling and walls are not shown in order to better show portions of the interior.

Particular attention is directed to the fact that each of the dwarf trees is positioned so that the spectators on the walkway cannot touch a tree, there being a protective zone 19a, 19b between each walkway 15 and its trees 14. The protective dimension of such protective zone 19 is greater than the reach of a spectator, and is generally at least four feet.

If desired, the roof can include one or more openings 21a, 21b, 21c, etc. so that much of the time, the trees will benefit from the normal changes in the weather. However, to protect the dwarf trees from storms or other adverse weather conditions, skylights 19a, 19b, etc. can be shifted from their parked positions way from such openings to cover such openings, each skylight being shiftable on rails 20.

Various modifications of the invention are possible without departing from the scope of the appended claims.

The invention claimed is:

1. A method of preparing a display which includes the steps of. preparing a plurality of dwarf trees, substantially each dwarf tree being identified with a particular individual human by reason of having been derived by a method involving the steps of preparing the remains of a particular individual in a finely divided form; preparing a mixture of said remains of a particular individual and dirt to provide a nutrient; planting a seedling of a dwarf tree in said mixture; nurturing said seedling until it grows into a dwarf tree; positioning the plurality of dwarf trees as an array protected from handling by spectators, so that spectators may see but not touch such trees by reason of a walkway for spectators being spaced from said array of dwarf trees by a protection zone having a protection dimension longer than the reach of a spectator.

2. The method of claim 1 in which the display of trees can normally be subjected to some of the variations of the weather but protected from adverse weather by the shifting of a skylight on rails to cover an opening in the roof of the building housing such display.

3. The display of trees prepared by the method of claim 1.

* * * * *